(12) United States Patent
Ha

(10) Patent No.: US 9,247,114 B2
(45) Date of Patent: Jan. 26, 2016

(54) CAMERA MODULE

(75) Inventor: Taemin Ha, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/359,043

(22) PCT Filed: Jun. 27, 2012

(86) PCT No.: PCT/KR2012/005089
§ 371 (c)(1),
(2), (4) Date: May 16, 2014

(87) PCT Pub. No.: WO2013/077520
PCT Pub. Date: May 30, 2013

(65) Prior Publication Data
US 2014/0333822 A1 Nov. 13, 2014

(30) Foreign Application Priority Data
Nov. 23, 2011 (KR) .................. 10-2011-0122844

(51) Int. Cl.
*H04N 5/225* (2006.01)
*G03B 17/02* (2006.01)
*G03B 3/10* (2006.01)

(52) U.S. Cl.
CPC ............... *H04N 5/2252* (2013.01); *G03B 3/10* (2013.01); *G03B 17/02* (2013.01); *H04N 5/2254* (2013.01)

(58) Field of Classification Search
CPC ............. H04N 5/2252–5/2254; H04N 5/2257; G03B 2217/002; G06K 9/209

USPC .......................................... 348/340, 373–374
See application file for complete search history.

(56) References Cited

U.S. PATENT DOCUMENTS

| | | | |
|---|---|---|---|
| 7,664,390 B2 * | 2/2010 | Cho et al. ...................... | 396/542 |
| 8,199,250 B2 * | 6/2012 | Kim et al. ..................... | 348/374 |
| 2005/0078207 A1 * | 4/2005 | Minamio et al. .............. | 348/340 |
| 2005/0099532 A1 * | 5/2005 | Tseng ............................ | 348/374 |
| 2007/0077050 A1 * | 4/2007 | Yu .................................. | 396/133 |
| 2010/0158509 A1 | 6/2010 | Kim et al. | |
| 2011/0050986 A1 * | 3/2011 | Wang ............................ | 348/371 |
| 2011/0075014 A1 * | 3/2011 | Hung ............................ | 348/340 |
| 2012/0025633 A1 * | 2/2012 | Lee et al. ..................... | 310/12.16 |

FOREIGN PATENT DOCUMENTS

| | | |
|---|---|---|
| KR | 20-0395227 Y1 | 9/2005 |
| KR | 10-2008-0048113 A | 6/2008 |
| KR | 10-2009-0053171 A | 5/2009 |
| KR | 10-2011-0065051 A | 6/2011 |
| TW | 200718588 A | 5/2007 |
| TW | 201109828 A | 3/2011 |

* cited by examiner

*Primary Examiner* — Kelly L Jerabek
(74) *Attorney, Agent, or Firm* — Birch, Stewart, Kolasch & Birch, LLP

(57) ABSTRACT

A camera module according to an aspect of the present invention includes a camera module housing configured to have an opening on the upper side thereof and have an image sensor installed therein and a window member made of light transmission material, formed to have a shape corresponding to the opening of the camera module housing, and fixed to the opening.

13 Claims, 2 Drawing Sheets

CAMERA MODULE

TECHNICAL FIELD

The present invention relates to a camera module.

BACKGROUND ART

In general, a camera module automatically controls a focus between an image sensor and a lens by using an auto-focusing unit including a voice coil motor for moving a lens holder installed movably up and down.

Accordingly, the upper part of the lens holder is chiefly opened in order to provide a space where the auto-focusing unit can move. In particular, although the camera module is surrounded by a shield can or a housing unit, a position facing the auto-focusing unit typically remains opened. Accordingly, there is a possibility that a contaminant may be introduced through a space unit formed between the shield can or the housing unit and the auto-focusing unit.

DISCLOSURE OF INVENTION

Technical Problem

An object of the present invention is to provide a camera module having an improved structure, which is capable of preventing a contaminant from entering the opened part of the camera module before the camera module is mounted on an electronic device.

Solution to Problem

A camera module according to an aspect of the present invention includes a camera module housing configured to have an opening on the upper side thereof and have an image sensor installed therein and a window member made of light transmission material, formed to have a shape corresponding to the opening of the camera module housing, and fixed to the opening.

It is better that the window member is spaced apart from an auto-focusing unit at a specific interval at a maximum rise position of the auto-focusing unit that is installed to reciprocate in the center of the camera module housing.

The opening may be provided to be concentric with the optical axis of a lens installed in the auto-focusing unit.

It is preferred that an adhesive substance be coated on the edge face of the window member and then the window member be adhered and fixed to the opening.

Here, it is preferred that the opening have a plurality of concave grooves formed in an inner circumferential face thereof, the window member include protrusions having a shape corresponding to the concave grooves, and the adhesive substance be coated on a face where the concave grooves and the protrusions face each other.

Alternatively, the adhesive substance may be coated on the entire inner circumferential face of the opening and the entire surface facing the inner circumferential face of the window member.

The window member may be adhered and fixed by an adhesive substance between the frame of the camera module housing and the window member so that the opening is closed.

It is preferred that the window member be made of any one of transparent resin and glass.

The opening may have a size corresponding to the diameter of a lens holder installed in the auto-focusing unit.

The opening may have a diameter greater than the lens holder installed in the auto-focusing unit.

It is preferred that the camera module housing be made of metal material having a function of shielding electromagnetic waves.

Advantageous Effects of Invention

In accordance with the present invention, the opened part of the camera module is sealed by the window member made of light transmission material. Accordingly, the inside of the camera module may always remain sealed without attaching an additional protection film.

Furthermore, the window member for shuts an opening is made of light transmission material having a certain degree of transparency. Accordingly, an assembly process can be further simplified because it is not necessary to remove the camera module mounted on an electronic device after the camera module is mounted on the electronic device.

BEST MODE FOR CARRYING OUT THE INVENTION

Exemplary embodiments of the present invention are described below with reference to the accompany drawings.

Figure 1:
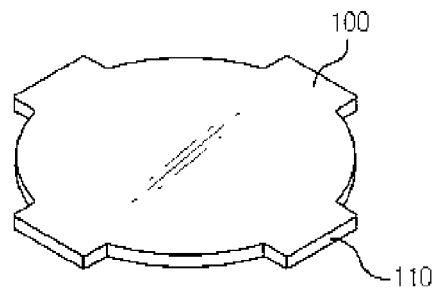
FIG. 1 is a perspective view of a camera module according to an exemplary embodiment of the present invention.
Figure 1:
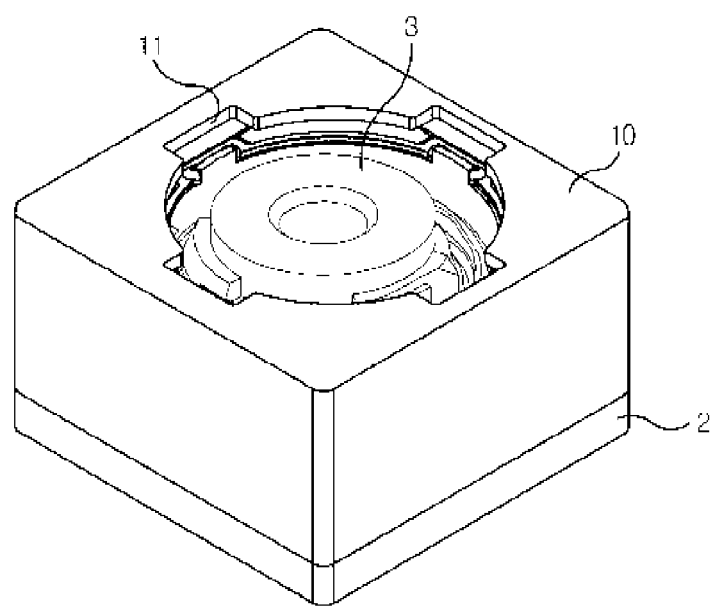
Figure 2:
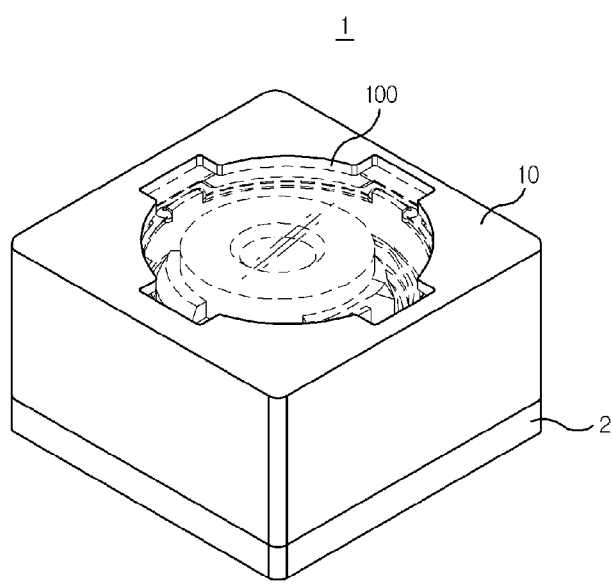
FIG. 2 is an exploded perspective view of FIG. 1.
Figure 3:
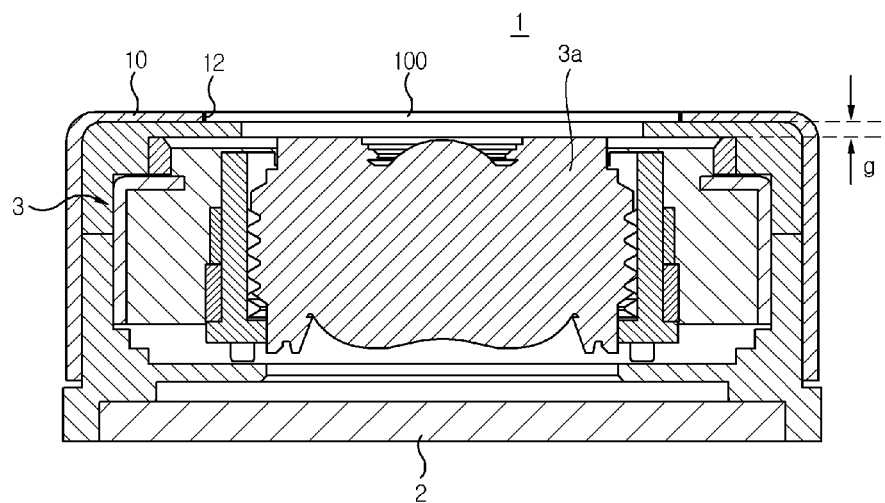
FIGS. 3 and 4 are cross-sectional views schematically showing the side of a camera module according to first and second embodiments of the present invention.
Figure 4:
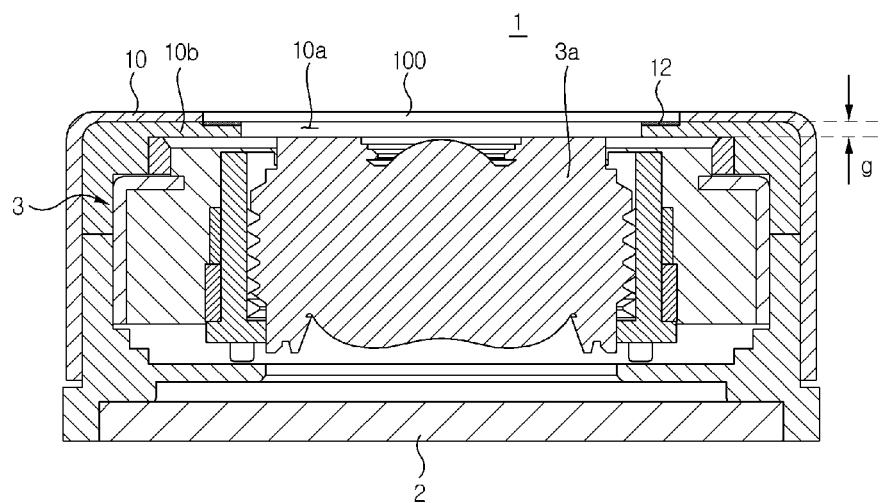

FIG. 1 is a perspective view of a camera module according to an exemplary embodiment of the present invention, FIG. 2 is an exploded perspective view of FIG. 1, and FIGS. 3 and 4 are cross-sectional views schematically showing the side of a camera module according to first and second embodiments of the present invention.

In the camera module 1 according to the exemplary embodiment of the present invention, a window member 100 made of light transmission material is installed in an opening 10a provided in a camera module housing 10 of FIGS. 1 and 2.

The camera module housing 10 is coupled to a circuit board 2 having an image sensor (not shown) mounted on a bottom thereof. An auto-focusing unit 3 including plural sheets of lenses is installed over the circuit board 2 within the camera module housing 10. Accordingly, a focus between the lenses and the image sensor is automatically controlled.

The auto-focusing unit 3 may have various structures. In the auto-focusing unit 3 of a voice coil motor method that is typically used, a bobbin in which a lens holder 3a including plural sheets of lens is installed reciprocates up and down, thus automatically controlling a focal distance between the lenses and the image sensor.

Accordingly, it is necessary to dispose the lens holder 3a of the auto-focusing unit 3 so that the lens holder 3a does not interfere with the window member 100 at its maximum rise position. To this end, as shown in FIG. 3, the window member 100 needs to be spaced apart from the lens holder 3a of the auto-focusing unit 3 at a specific interval g. Here, the interval g needs to be grater than the displacement of the auto-focusing unit 3. If the interval g is greater than the displacement of the auto-focusing unit 3, the window member 100 may collide against the auto-focusing unit 3 during an auto-focusing operation, leading to the damaged window member 100.

The window member 100 may be made of any one of transparent resin and glass, but not limited thereto. The window member 100 may be made of any material as long as the material has an excellent degree of transparency.

In accordance with an exemplary embodiment of the present invention, the window member 100 may have an edge face coated with an adhesive substance 12, and the window member 100 is then adhered to the opening 10a, as shown in FIG. 3. Here, a plurality of concave grooves 11 may be formed on the inner circumferential face of the opening 10a, the window member 100 may include protrusions 110 corresponding to the respective concave grooves 11, and the adhesive substance 12 may be coated on a face where the concave grooves 11 and the protrusions 110 face each other, as shown in FIGS. 1 and 2. The number of each of the concave grooves 11 and the protrusions 110 may be 4 so that the concave grooves 11 and the protrusions 110 are symmetrical to each other as shown in FIGS. 1 and 2, but not limited thereto. The number of each of the concave grooves 11 and the protrusions 110 may be increased or decreased depending on a design of the camera module 1. Furthermore, the concave grooves 11 and the protrusions 110 are not limited to the shapes shown in the drawings, and they may have different shapes.

In accordance with an exemplary embodiment of the present invention, the adhesive substance 12 for adhering and fixing the window member 100 may be coated on all the four concave grooves 11, but the window member 100 may be fixed by coating the adhesive substance 12 on only a pair of the concave grooves 11 facing each other, from among the four concave grooves 11.

In accordance with another embodiment of the present invention, the adhesive substance 12 may be coated on the entire inner circumferential face of the opening 10a and the entire surface that faces the inner circumferential face of the window member 100.

In accordance with yet another embodiment of the present invention, frame members for supporting elements forming the auto-focusing unit 3 may be provided within the camera module housing 10. The adhesive substance 12 may be coated on a surface that faces the window member 100 of an upper frame 10b (see FIGS. 2 and 4) that is placed at the highest position.

Meanwhile, although (not shown), a latch jaw having a stair shape may be formed in the circumferential face of the opening 10a, a latch unit complimentary to the shape of the latch jaw may be formed at a position corresponding to the window member 100, and the adhesive substance 12 may be coated at a part where the latch jaw comes in contact with the latch unit. In an alternative, a screw thread instead of the adhesive substance 12 may be formed in a surface where the circumferential face of the opening 10a faces the window member 100 so that the opening 10a and the window member 100 are physically screwed. In some embodiments, the opening 10a and the window member 100 may be coupled by using various methods, such as a method of forcibly fitting the window member 100 into the opening 10a with a rubber ring interposed therebetween.

That is, the window member 100 is for securing the sealing of the camera module 1 while moving and is not subject to external load. Thus, the window member 100 may have any construction only if the construction can shut the opening 10a in a transmittable state and can fix a transparent window member that does not need to be removed without a reduction in the performance of the camera module.

Meanwhile, it is preferred that the diameter of the opening 10a corresponds to the diameter of the lens holder 3a of the auto-focusing unit 3, but the diameter of the opening 10a be not excessively greater than the diameter of the lens holder 3a. If the diameter of the opening 10a is excessively great, there is a possibility that the performance of the camera module may be deteriorated because the amount of unnecessary light externally introduced is increased. In particular, light may leak in a gap between the circuit board 2 and the lens holder 3a equipped with the lenses.

It is also preferred that the camera module housing 10 be made of metal material having a function of shielding electromagnetic waves. The camera module housing 10 may be made of resin material. In this case, however, there are problems in that electromagnetic waves generated when the auto-focusing unit 3 is operated may affect an electronic device in which the camera module 1 is installed and external electromagnetic waves may function as noise to the image sensor.

If, as described above, the opening 10a of the camera module housing 10 is sealed with the window member 100 made of light transmission material, it is possible to prevent a contaminant from entering the camera module 1 while carrying the camera module 1 in order to mount the camera module 1 on an electronic device.

Furthermore, an assembly task can be performed more effectively and rapidly because a process of closing the opening 10a by attaching an additional protection film and removing the protection film after mounting the camera module 1 can be obviated.

Meanwhile, although not shown, a hard film member made of transparent material that may close the opening 10a may be adhered to the upper lateral part of the camera module housing 10. In this case, the hard film member is formed to have a shape corresponding to the upper lateral part of the camera module housing 10 so that the hard film member covers the opening 10a, or the hard film member may be formed to have a circle slightly greater than the diameter of the opening 10a so that a part where the hard film member comes in a surface contact with the upper lateral part of the camera module housing 10 can be adhered and fixed.

As described above, the present invention may include any construction only if the construction may close the opening, has high light transmission to the extent that the construction needs not to be subsequently removed, and has a property that transmits light, but is not refracted.

The embodiments of the present invention described above and shown in the drawings should not be construed as limiting the technical spirit of the present invention. The scope of the present invention is restricted by only the claims, and a person having ordinary skill in the art to which the present invention pertains may improve and modify the technical spirit of the present invention in various forms. Accordingly, the modifications and modifications will fall within the scope of the present invention as long as they are evident to those skilled in the art.

INDUSTRIAL APPLICABILITY

The camera module of the present invention may be applied to portable electronic devices, such as smart phones, laptop computers, and tablet PCs.

The invention claimed is:

1. A camera module, comprising:
  a camera module housing including an upper surface and a lateral surface bent downwardly from the upper surface;
  an opening formed at the upper surface of the camera module housing; and a window member made of light transmission material and disposed in the opening, wherein the window member includes a circular portion having a shape of a circle and a protrusion formed to extend outwardly from the circular portion, and wherein the opening includes a concave groove recessed from an inner circumferential surface of the upper surface of the camera module housing forming the opening toward an external side of the camera module to have a shape corresponding to the protrusion of the window member.

2. The camera module of claim 1, wherein the window member is spaced apart from an auto-focuser at a specific interval at a maximum rise position of the auto-focuser that is installed to reciprocate in a center of the camera module housing.

3. The camera module of claim 2, wherein the opening is provided to be concentric with an optical axis of a lens installed in the auto-focuser.

4. The camera module of claim 1, wherein an adhesive substance is coated on an edge surface of the window member, and the window member is adhered and fixed to the opening.

5. The camera module of claim 4, wherein:
the adhesive substance is coated on a surface where the concave groove and the protrusion face each other.

6. The camera module of claim 4, wherein the adhesive substance is coated on the entire inner circumferential surface of the upper surface of the camera module housing forming the opening and an entire surface of the window member facing the entire inner circumferential surface of the upper surface of the camera module housing forming the opening.

7. The camera module of claim 2, wherein the opening has a size corresponding to a diameter of a lens holder installed in the auto-focuser.

8. The camera module of claim 2, wherein the opening has a diameter greater than a lens holder installed in the auto-focuser.

9. The camera module of claim 1, wherein the window member is adhered and fixed by an adhesive substance between a frame of the camera module housing and the window member so that the opening is closed.

10. The camera module of claim 1, wherein the window member is made of any one of transparent resin and glass.

11. The camera module of claim 1, wherein the camera module housing is made of metal material having a function of shielding electromagnetic waves.

12. The camera module of claim 1, wherein the camera module housing has a shape of a bottom-opened hexahedron, and
wherein the opening is disposed on a center of the upper surface of the camera module housing.

13. The camera module of claim 1, wherein a thickness of the window member corresponds with a thickness of the upper surface of the camera module housing.

* * * * *